Aug. 21, 1928.
L. G. APPLEY
1,681,759
MOSAIC TOY
Filed May 28, 1926
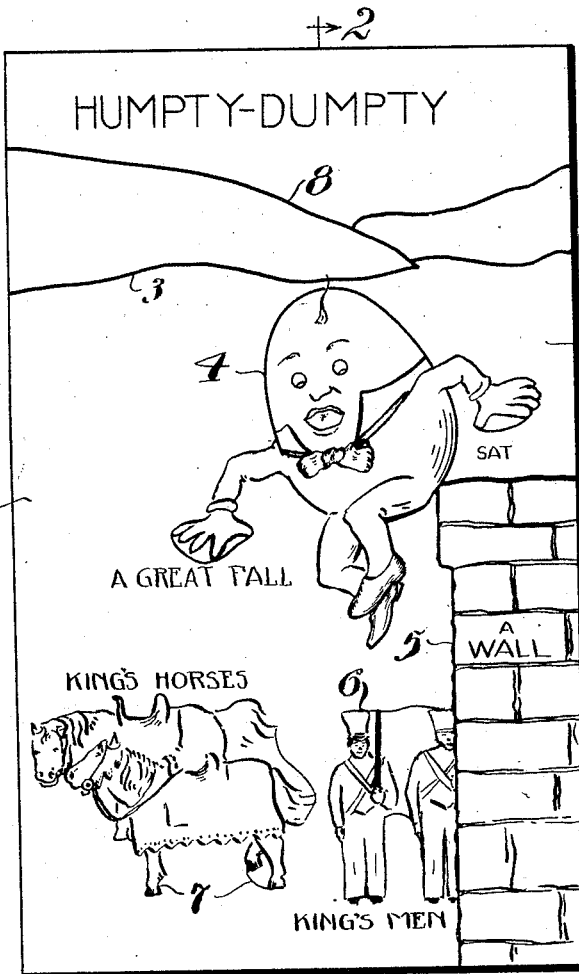
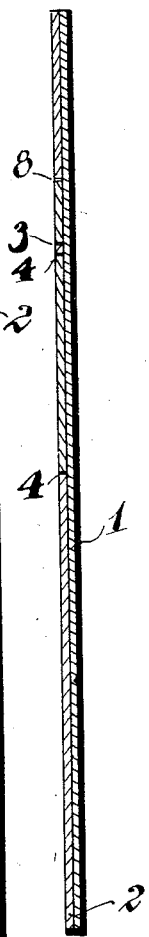
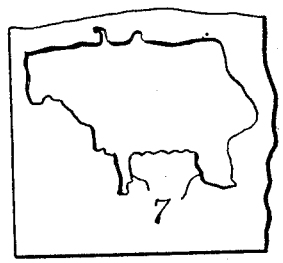
Fig. 1  Fig. 2
Fig. 3
Inventor
Lena G. Appley
By A. S. Johnson
Attorney Patented Aug. 21, 1928.

1,681,759

UNITED STATES PATENT OFFICE.

LENA GRACE APPLEY, OF ST. PAUL, MINNESOTA.

MOSAIC TOY.

Application filed May 28, 1926. Serial No. 112,273.

The present invention relates to a mosaic toy which is particularly adapted to the teaching of word meanings to younger children.

An object of the present invention is to make a mosaic toy having a background bearing certain words thereon and having cut away portions to receive pictured representations insertible in said cut away portions, said pictured representations illustrating the thought presented by the words on the background.

In order to attain this object, there is provided, in accordance with one feature of the invention, a supporting base member of fibreboard, or other suitable stiff material, with a background member having some thickness connected thereto, said background having openings therein to receive pictured representations of certain acts or characters, the background bearing words or phrases adjacent each of the openings designed to receive said pictured representations, said words being descriptive of the act or character embodied in said picture.

These and other features of the invention will be more fully brought out in the following description and the accompanying drawings, wherein:

Figure 1, is a view in front elevation of one form of the device with a background having outlined spaced therein and having pictured representations in place in said spaces.

Figure 2, is a sectional view on the line 2—2 of Figure 1; and

Figure 3, is a fragmentary view of the lower left-hand portion of the structure shown in Figure 1, with a cut-out figure removed.

Referring to the drawings in detail, the particular toy illustrated is designed to instruct a child in the meaning of the various portions of the familiar nursery rhyme "Humpty Dumpty". A supporting member 1, which may be of stiff cardboard, has a background member 2 firmly secured thereto as by gluing. This background member extends from the line 3 downwardly to the bottom of the device, being cut out around the outline of Humpty Dumpty as at 4, around the outline of the wall as at 5, around the outline of the two king's men as at 6, around the outline of the king's horses as at 7, along the lower contour lines of the distant hills as at 3, and along the upper contour lines of said hills as at 8. All of the portions except the background are removable, merely resting upon the supporting member in the cut out portions of the background member provided therefor.

The average child of an age to be benefited by a toy of the present character finds it impossible, except in extraordinary cases, to put together an ordinary type of mosaic toy, since the various loose pieces thereof constitute a bewildering array with which the young mind has not sufficient thought associations to cope. In the present instance, however, the background 2 comprises a starting point from which to build. The pieces, which are preferably few in number, have each but one place in the background in which they can be properly fitted, and the outline of the piece itself suggests its proper location. The word associated with each pictured representation is forcefully brought home to the child upon the proper placing of each piece, which, coupled with the intense interest which accompanies the performance impresses the word and its meaning on the child's mind in a way which no amount of ordinary class room work could accomplish.

Other familiar and interesting childhood tales may be worked out in the same way without departing from the spirit or scope of the invention.

I claim:

1. A mosaic toy of the character described, comprising a background having cut-away portions therein, word indicia adjacent said cut-away portions, and pictured representations removably insertible in said cut-away portions, the pictured representations being described by the word indicia adjacent the cut-away portions of the background in which they are insertible.

2. A toy of the character described, comprising a background member having an outlined space thereon adapted to receive a cut-out figure, word indicia adjacent said space descriptive of a cut-out figure to be associated therewith, and a cut-out figure having an outline to register with said space.

3. A toy of the character described, comprising a background having a scene pictured thereon, an outlined space on said scene adapted to receive a cut-out figure, and a cut-out figure having an outline to register with said space, and being pictured to fit into and complete the scene on said background.

In testimony whereof I affix my signature.

LENA GRACE APPLEY.